US011483629B2

(12) United States Patent
Mate et al.

(10) Patent No.: US 11,483,629 B2
(45) Date of Patent: Oct. 25, 2022

(54) PROVIDING VIRTUAL CONTENT BASED ON USER CONTEXT

(71) Applicant: Nokia Technologies Oy, Espoo (FI)

(72) Inventors: Sujeet Mate, Tampere (FI); Igor Curcio, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 176 days.

(21) Appl. No.: 16/961,752

(22) PCT Filed: Jan. 15, 2019

(86) PCT No.: PCT/FI2019/050029

§ 371 (c)(1),
(2) Date: Jul. 13, 2020

(87) PCT Pub. No.: WO2019/141903

PCT Pub. Date: Jul. 25, 2019

(65) Prior Publication Data

US 2021/0067840 A1 Mar. 4, 2021

(30) Foreign Application Priority Data

Jan. 17, 2018 (GB) ..................................... 1800753

(51) Int. Cl.
*H04N 21/81* (2011.01)
*A63F 13/355* (2014.01)
(Continued)

(52) U.S. Cl.
CPC ......... *H04N 21/816* (2013.01); *A63F 13/355* (2014.09); *A63F 13/5255* (2014.09); *A63F 13/65* (2014.09); *G06T 19/006* (2013.01)

(58) Field of Classification Search
CPC . H04N 21/816; A63F 13/355; A63F 13/5255; A63F 13/65; G06T 19/006
See application file for complete search history.

(56) References Cited

U.S. PATENT DOCUMENTS 5,900,879 A 5/1999 Berry et al.
10,497,175 B2 * 12/2019 Mount ............ H04N 21/41415
(Continued)

FOREIGN PATENT DOCUMENTS

WO 2017/005980 A1 1/2017
WO 2017/202899 A1 11/2017
WO WO-2020184645 A1 * 9/2020

OTHER PUBLICATIONS

"Information Technology—Dynamic Adaptive Streaming Over HTTP (DASH)—Part 1: Media Presentation Description and Segment Formats", ISO/IEC 23009-1, May 15, 2014, 152 pages.
(Continued)

*Primary Examiner* — Fernando Alcon
(74) *Attorney, Agent, or Firm* — Joseph C. Drish; Harrington & Smith

(57) ABSTRACT

Methods and apparatuses are disclosed for providing virtual content based on user context. An example apparatus comprises means providing a plurality of virtual content data sets for transmission to a remote user device, the data sets representing virtual content in relation to a common scene and each covering a different respective region of said scene. The apparatus may also comprise means for transmitting one or more of the data sets to the remote user device for consumption. The apparatus may also comprise means for transmitting to the remote user device auxiliary data, the auxiliary data being usable to cause the remote user device to switch from consuming a current data set representing a current region of said scene to a different set of virtual content data representing a different region of said scene, the switching being based at least partly on a determined context of the remote user device.

29 Claims, 6 Drawing Sheets

24 Yaw 27 1 25 Pitch 23 Roll 22 20 26 10

(51) Int. Cl.
*A63F 13/5255* (2014.01)
*A63F 13/65* (2014.01)
*G06T 19/00* (2011.01)

(56) References Cited

U.S. PATENT DOCUMENTS

2012/0166667 A1* 6/2012 Hall ...................... H04L 65/607 709/231
2016/0165309 A1 6/2016 Van Brandenburg et al.
2017/0123750 A1* 5/2017 Todasco .................. G06F 3/147
2017/0316639 A1 11/2017 Lyons et al.
2017/0345167 A1 11/2017 Ard et al.
2017/0347026 A1 11/2017 Hannuksela
2017/0352191 A1* 12/2017 Zhou .................... H04N 21/816
2018/0025752 A1* 1/2018 Patel .................... H04N 9/8715 386/240
2018/0095542 A1* 4/2018 Mallinson ............. G06T 19/006
2018/0098107 A1* 4/2018 Hirabayashi ..... H04N 21/21815
2018/0192081 A1* 7/2018 Huang ................. H04N 13/279
2019/0102941 A1* 4/2019 Khan .................... G06T 19/006
2020/0045359 A1* 2/2020 Tokumo ............. H04N 21/8586
2020/0382796 A1* 12/2020 Wang ..................... H04N 19/96
2021/0029386 A1* 1/2021 Hamada ................ G10L 19/008

OTHER PUBLICATIONS

Search Report received for corresponding United Kingdom Patent Application No. 1800753.4, dated Jun. 26, 2018, 5 pages.
International Search Report and Written Opinion received for corresponding Patent Cooperation Treaty Application No. PCT/FI2019/050029, dated Apr. 12, 2019, 15 pages.
Extended European Search Report received for corresponding European Patent Application No. 19741486.5, dated Aug. 25, 2021, 8 pages.

* cited by examiner

PROVIDING VIRTUAL CONTENT BASED ON USER CONTEXT

RELATED APPLICATION

This application claims priority to PCT Application No. PCT/F12019/050029, filed on Jan. 15, 2019, which claims priority to Great Britain Patent Application No. 1800753.4, filed on Jan. 17, 2018, each of which is incorporated herein by reference in its entirety.

FIELD

This disclosure relates to methods and systems for providing virtual content based on user context, including, but not necessarily limited to mixed reality, virtual reality and augmented reality.

BACKGROUND

Immersive multimedia such as Virtual reality (VR) is a rapidly developing area of technology in which audio and/or image and/or video content is provided to a user device, such as a headset. As is known, the user device may be provided with a live or stored feed from an audio and/or image and/or video content source, the feed representing a virtual reality space or world for immersive output through the user device. In some example embodiments, the audio may be spatial audio. A virtual space or virtual world is any computer-generated version of a space, for example a captured real world space, in which a user can be immersed through the user device. For example, a virtual reality headset may be configured to provide virtual reality video and/or image and/or audio content to the user, e.g. through the use of a pair of display screens and/or headphones incorporated within the headset.

Position and/or movement of the user device can enhance the immersive experience. Currently, most virtual reality headsets use so-called three degrees of freedom (3DoF) which means that the head movement in the yaw, pitch and roll axes are measured and determine what the user sees and/or hears. This facilitates the scene remaining largely static in a single location as the user rotates their head. A next stage may be referred to as 3DoF+ which may facilitate limited translational movement in Euclidean space in the range of, e.g. tens of centimetres, around a location. A yet further stage is a six degrees-of-freedom (6DoF) virtual reality system, where the user is able to freely move in the Euclidean space and rotate their head in the yaw, pitch and roll axes. Six degrees-of-freedom virtual reality systems and methods will enable the provision and consumption of volumetric virtual reality content.

Volumetric virtual reality content comprises data representing spaces and/or objects in three-dimensions from all angles, enabling the user to move fully around the spaces and/or objects to view them from any angle. For example, a person or object may be fully scanned and reproduced within a real-world space. When rendered to a virtual reality headset, the user may 'walk around' the person or object and view and/or hear them from the front, the sides and from behind. Users may also be able to interact with other objects, for example virtual objects (e.g. a computer-generated person or object or service) or real objects (e.g. another person involved in the same virtual scene.)

More immersive technologies, such as, but not limited to, 3DoF, 3DoF+ and 6DoF are more complex for the end user device to handle compared to technologies offering a limited field of view. In addition to complexity, such media also results in greater uncertainty in terms of what is the spatial region which may be of interest. This is due to the amount of freedom available to the end user when consuming the content, i.e. viewing or listening to virtual content. This maybe further complicated when the virtual space or world is generated from multiple spatial positions, such as using two or more spatially separate omnidirectional cameras capturing a common scene such as a sporting event or concert.

For the avoidance of doubt, references to virtual reality (VR) are also intended to cover related technologies such as augmented reality (AR) and mixed reality (MR).

SUMMARY

One embodiment provides an apparatus, comprising: means providing a plurality of virtual content data sets for transmission to a remote user device, the data sets representing virtual content in relation to a common scene and each covering a different respective region of said scene; means for transmitting one or more of the data sets to the remote user device for consumption; and means for transmitting to the remote user device auxiliary data, the auxiliary data being usable to cause the remote user device to switch from consuming a current data set representing a current region of said scene to a different set of virtual content data representing a different region of said scene, the switching being based at least partly on a determined context of the remote user device.

The transmitted auxiliary data may be usable by the remote user device to cause switching to the different set of virtual content data based at least partly on its locally-determined context. Plural sets of virtual content data may be transmitted substantially simultaneously. The auxiliary data may be transmitted simultaneously with the virtual content data. The auxiliary data may be transmitted in advance of the plural sets of virtual content data.

The auxiliary data may be transmitted as metadata indicating, for each of a plurality of switchable data sets, a corresponding context of the remote device that will cause switching to that data set at the remote user device.

The data sets may represent virtual content captured from different respective spatial positions in the scene, and wherein the auxiliary data may be usable by the user device to switch to a data set representing a different spatial position in the scene.

The data sets may represent virtual content captured from different spatial capture devices at the respective spatial positions in the scene.

The data sets may further represent virtual content captured from different orientations of each spatial capture device, and wherein the auxiliary data may be usable by the user device to switch to a particular orientation of a selected one of the spatial capture devices.

The auxiliary data may indicate one or more viewports of the scene, to be switched to based on the viewport of the currently-consumed set of virtual content data.

The auxiliary data may indicate one or more viewports of the scene which capture a region of said scene which overlaps the viewport of the currently-consumed set of virtual content data.

The auxiliary data may indicate one or more viewports of the scene, to be switched to based on said viewports capturing a region of said scene which includes an object-of-interest to the user.

The apparatus may further comprise means for determining the object-of-interest to the user.

The determining means may determine the object-of-interest to the user using an object-recognition algorithm which takes as input one or more objects identified in one or more of the currently-consumed set of virtual content data and previously consumed sets of virtual content data.

The auxiliary data may indicate a positional relationship between the capture position of the currently-consumed set of virtual content data and the capture positions of the other sets of virtual content data.

The apparatus may further comprise means for receiving from the remote user device one or more switching requests and, in response to said request, for transmitting a different set of virtual content data to the remote user device.

The data sets may represent virtual reality video data captured from different spatial locations in the common scene.

Another embodiment provides an apparatus, comprising: means for receiving a plurality of virtual content data from a server, the data sets representing virtual content in relation to a common scene, and each covering a different respective region of said scene; means for receiving auxiliary data, the auxiliary data being usable to cause the apparatus to switch from consuming a current virtual content data set representing a current region of said scene to a different virtual content data set representing a different region of said scene based at last partly on a determined context of the apparatus; and means for switching to a different virtual content data set based on the auxiliary data and a determined context of the apparatus.

The apparatus may further comprise means to determine the context of the apparatus.

Plural sets of virtual content data may be received substantially simultaneously. The auxiliary data may be received simultaneously with the virtual content data. The auxiliary data may be received in advance of the plural sets of virtual content data.

The auxiliary data may be received as metadata indicating, for each of a plurality of switchable data sets, a corresponding context of the apparatus that will cause switching to that data set.

The data sets may represent virtual content captured from different respective spatial positions in the scene, and wherein the auxiliary data may be usable by the apparatus to switch to a data set representing a different spatial position in the scene.

The data sets may represent virtual content captured from different spatial capture devices at the respective spatial positions in the scene.

The data sets may further represent virtual content captured from different orientations of each spatial capture device, and wherein the auxiliary data is usable by the apparatus to switch to a particular orientation of a selected one of the spatial capture devices.

The auxiliary data may indicate one or more viewports of the scene, to be switched to based on the viewport of the currently-consumed set of virtual content data.

The auxiliary data may indicates one or more viewports of the scene which capture a region of said scene which overlaps the viewport of the currently-consumed set of virtual content data.

The auxiliary data may indicates one or more viewports of the scene, to be switched to based on said viewports capturing a region of said scene which includes an object-of-interest to the user.

The apparatus may further comprise means for determining the object-of-interest to the user.

The determining means may determine the object-of-interest to the user using an object-recognition algorithm which takes as input one or more objects identified in one or more of the currently-consumed set of virtual content data and previously consumed sets of virtual content data.

The auxiliary data may indicate a positional relationship between the capture position of the currently-consumed set of virtual content data and the capture positions of the other sets of virtual content data.

The apparatus may further comprise means for transmitting to the server one or more switching requests and, in response to said request, for receiving a different set of virtual content data to the remote user device.

The data sets may represent virtual reality video data captured from different spatial locations in the common scene.

Another embodiment provides a method, comprising: providing a plurality of virtual content data sets for transmission to a remote user device, the data sets representing virtual content in relation to a common scene and each covering a different respective region of said scene; transmitting one or more of the data sets to the remote user device for consumption; and transmitting to the remote user device auxiliary data, the auxiliary data being usable to cause the remote user device to switch from consuming a current data set representing a current region of said scene to a different set of virtual content data representing a different region of said scene, the switching being based at least partly on a determined context of the remote user device.

The transmitted auxiliary data may be usable by the remote user device to cause switching to the different set of virtual content data based at least partly on its locally-determined context. Plural sets of virtual content data may be transmitted substantially simultaneously.

The auxiliary data may be transmitted simultaneously with the virtual content data. The auxiliary data may be transmitted in advance of the plural sets of virtual content data.

The auxiliary data may be transmitted as metadata indicating, for each of a plurality of switchable data sets, a corresponding context of the remote device that will cause switching to that data set at the remote user device.

The data sets may represent virtual content captured from different respective spatial positions in the scene, and wherein the auxiliary data may be usable by the user device to switch to a data set representing a different spatial position in the scene.

The data sets may represent virtual content captured from different spatial capture devices at the respective spatial positions in the scene.

The data sets may further represent virtual content captured from different orientations of each spatial capture device, and wherein the auxiliary data may be usable by the user device to switch to a particular orientation of a selected one of the spatial capture devices.

The auxiliary data may indicate one or more viewports of the scene, to be switched to based on the viewport of the currently-consumed set of virtual content data.

The auxiliary data may indicate one or more viewports of the scene which capture a region of said scene which overlaps the viewport of the currently-consumed set of virtual content data.

The auxiliary data may indicate one or more viewports of the scene, to be switched to based on said viewports capturing a region of said scene which includes an object-of-interest to the user.

The method may further comprise determining the object-of-interest to the user.

The determining may determine the object-of-interest to the user using an object-recognition algorithm which takes as input one or more objects identified in one or more of the currently-consumed set of virtual content data and previously consumed sets of virtual content data.

The auxiliary data may indicate a positional relationship between the capture position of the currently-consumed set of virtual content data and the capture positions of the other sets of virtual content data.

The method may further comprise receiving from the remote user device one or more switching requests and, in response to said request, for transmitting a different set of virtual content data to the remote user device.

The data sets may represent virtual reality video data captured from different spatial locations in the common scene.

Another embodiment provides a method, comprising: receiving a plurality of virtual content data from a server, the data sets representing virtual content in relation to a common scene, and each covering a different respective region of said scene; receiving auxiliary data, the auxiliary data being usable to cause the apparatus to switch from consuming a current virtual content data set representing a current region of said scene to a different virtual content data set representing a different region of said scene based at last partly on a determined context of the apparatus; and switching to a different virtual content data set based on the auxiliary data and a determined context of the apparatus.

The method may further comprise determining the context of the apparatus.

Plural sets of virtual content data may be received substantially simultaneously. The auxiliary data may be received simultaneously with the virtual content data. The auxiliary data may be received in advance of the plural sets of virtual content data.

The auxiliary data may be received as metadata indicating, for each of a plurality of switchable data sets, a corresponding context of the apparatus that will cause switching to that data set.

The data sets may represent virtual content captured from different respective spatial positions in the scene, and wherein the auxiliary data may be usable by the apparatus to switch to a data set representing a different spatial position in the scene.

The data sets may represent virtual content captured from different spatial capture devices at the respective spatial positions in the scene.

The data sets may further represent virtual content captured from different orientations of each spatial capture device, and wherein the auxiliary data is usable by the apparatus to switch to a particular orientation of a selected one of the spatial capture devices.

The auxiliary data may indicate one or more viewports of the scene, to be switched to based on the viewport of the currently-consumed set of virtual content data.

The auxiliary data may indicates one or more viewports of the scene which capture a region of said scene which overlaps the viewport of the currently-consumed set of virtual content data.

The auxiliary data may indicates one or more viewports of the scene, to be switched to based on said viewports capturing a region of said scene which includes an object-of-interest to the user.

The method may further comprise determining the object-of-interest to the user.

The determining may determine the object-of-interest to the user using an object-recognition algorithm which takes as input one or more objects identified in one or more of the currently-consumed set of virtual content data and previously consumed sets of virtual content data.

The auxiliary data may indicate a positional relationship between the capture position of the currently-consumed set of virtual content data and the capture positions of the other sets of virtual content data.

The method may further comprise transmitting to the server one or more switching requests and, in response to said request, for receiving a different set of virtual content data to the remote user device.

The data sets may represent virtual reality video data captured from different spatial locations in the common scene.

Another embodiment provides a computer program comprising instructions that when executed by a computer program control it to perform the method of any preceding method definition.

Another embodiment provides a non-transitory computer-readable storage medium having stored thereon computer-readable code, which, when executed by at least one processor, causes the at least one processor to perform a method, comprising: providing a plurality of virtual content data sets for transmission to a remote user device, the data sets representing virtual content in relation to a common scene and each covering a different respective region of said scene; transmitting one or more of the data sets to the remote user device for consumption; and transmitting to the remote user device auxiliary data, the auxiliary data being usable to cause the remote user device to switch from consuming a current data set representing a current region of said scene to a different set of virtual content data representing a different region of said scene, the switching being based at least partly on a determined context of the remote user device.

Another embodiment provides an apparatus, the apparatus having at least one processor and at least one memory having computer-readable code stored thereon which when executed controls the at least one processor: to provide a plurality of virtual content data sets for transmission to a remote user device, the data sets representing virtual content in relation to a common scene and each covering a different respective region of said scene; to transmit one or more of the data sets to the remote user device for consumption; and to transmit to the remote user device auxiliary data, the auxiliary data being usable to cause the remote user device to switch from consuming a current data set representing a current region of said scene to a different set of virtual content data representing a different region of said scene, the switching being based at least partly on a determined context of the remote user device.

Another embodiment provides a non-transitory computer-readable storage medium having stored thereon computer-readable code, which, when executed by at least one processor, causes the at least one processor to perform a method, comprising:

receiving a plurality of virtual content data from a server, the data sets representing virtual content in relation to a common scene, and each covering a different respective region of said scene; receiving auxiliary data, the auxiliary data being usable to cause the apparatus to switch from consuming a current virtual content data set representing a current region of said scene to a different virtual content data set representing a different region of said scene based at last partly on a determined context of the apparatus; and switching to a different virtual content data set based on the auxiliary data and a determined context of the apparatus.

Another embodiment provides an apparatus, the apparatus having at least one processor and at least one memory having computer-readable code stored thereon which when executed controls the at least one processor: to receive a plurality of virtual content data from a server, the data sets representing virtual content in relation to a common scene, and each covering a different respective region of said scene; to receive auxiliary data, the auxiliary data being usable to cause the apparatus to switch from consuming a current virtual content data set representing a current region of said scene to a different virtual content data set representing a different region of said scene based at last partly on a determined context of the apparatus; and to switch to a different virtual content data set based on the auxiliary data and a determined context of the apparatus.

BRIEF DESCRIPTION OF THE DRAWINGS

The invention will now be described, by way of non-limiting example, with reference to the accompanying drawings, in which.

DETAILED DESCRIPTION

Figure 1:
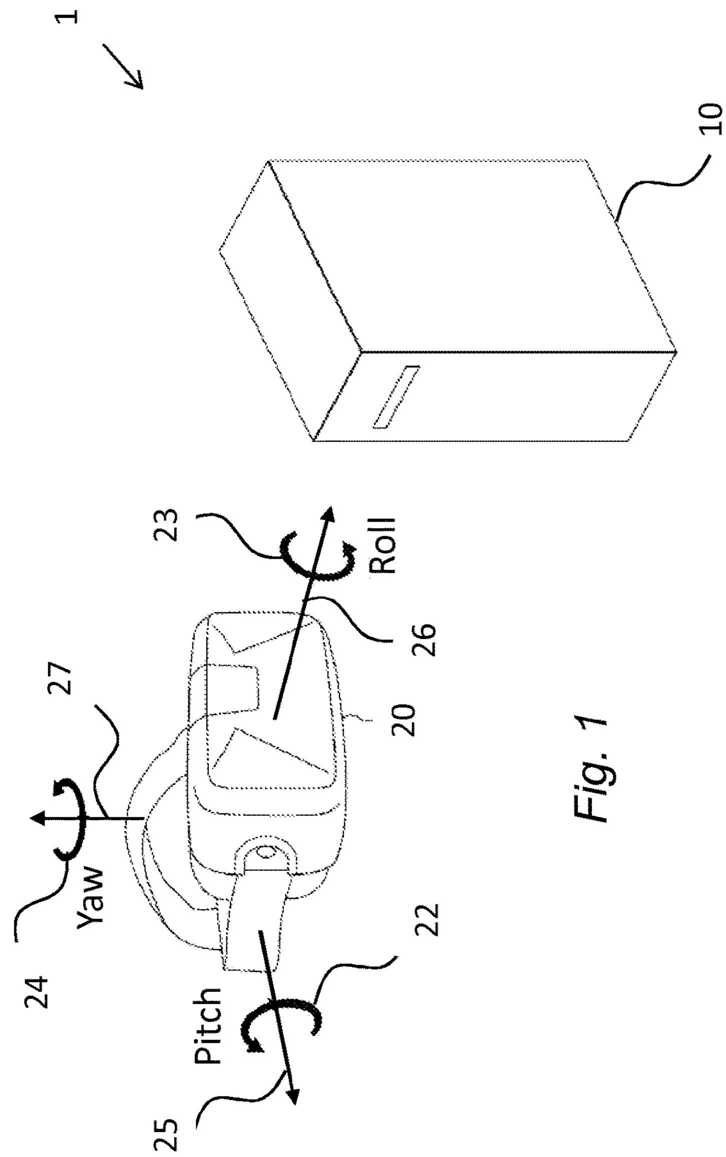
FIG. 1 is a perspective view of a virtual reality display system, useful for understanding embodiments.

In the description and drawings, like reference numerals refer to like elements throughout.

Embodiments herein relate to immersive media, such as for example virtual reality (VR), and in particular to processing methods and systems for providing one or all of video, image and audio data representing a virtual space. The virtual space may be generated based on capturing images and/or videos and/or sound from a real-world space. The virtual space may alternatively be computer-generated. The virtual space may also be a combination of computer-generated and real-world space.

Embodiments are applicable to any form of immersive multimedia methods or systems. Such methods and systems are applicable to related technologies, including Virtual Reality (VR), Augmented Reality (AR) and mixed reality (MR).

Embodiments are particularly concerned with the provision of virtual content based on a user context. In this regard, a "user context" refers to any detectable or selectable situation or preference associated with one or more consuming users, which may be based at least partially on currently-consumed content. For example, a current position (viewing orientation, position, and gaze) of a user device in a virtual space can provide context. In this regard, position may refer to spatial position and/or orientation and/or gaze direction. For example, an object-of-interest in video or image or audio data currently being consumed can provide context. An object-of-interest may relate to any object, including people. An object-of-interest may be identified manually by the user, or may be detected automatically, for example using object recognition based on a currently consumed viewport and/or based on historical data indicating an amount of time a particular object is viewed. Machine-learning techniques may be employed to identify one or more objects-of-interest. Another example the current position may refer to a viewport to the currently consumed virtual reality content.

The term "consumed" or "consumption" is used herein to refer to the act of viewing or hearing a portion of virtual content, i.e. that which is being output to the user; if the virtual content data is video/image data, then that part of the video/image data which is rendered and made viewable to the user is that which is being consumed. Similarly, if the virtual content data is audio data, then that part of the audio scene which is rendered and made audible to the user is that which is being consumed. It is assumed that, at any one time, only a part of an overall virtual scene is being consumed based, for example, on what the author of the virtual content wishes to the user to see or hear, and/or on what the user wishes to see or hear by exploring the virtual content within which they are immersed. The part or portion of the virtual content may be based on the position of the user device and is referred to generally as "the viewport." However, the consumption of media data is not restricted to be consumed in parts for example a user may choose to view only a part of the visual scene but may choose to consume omnidirectional audio.

Embodiments herein may provide plural sets of virtual content data, relating to a common scene (e.g. a captured or computer-generated scene of a single event) with each set relating to a different respective portion of said scene. For example, one set may relate to a field-of-view from a first camera and another set may relate to a field-of-view from a second camera. The first and second cameras may be at spatially different locations. Further, auxiliary data, which may be (but is not limited to) metadata associated with one or more sets of the virtual content data may determine how switching takes place from a currently consumed set of virtual content data to another set based on the context. According to embodiments of the invention, the switching may be triggered by user indication or interaction. For example, a user may indicate that (s)he would like to switch to another data set. Alternatively, the switching may be triggered based on context of the user and a condition specified by content creator. For example, user device may report its current context to content provider, e.g. an immersive media server. The content provider device may determine that the current context of the user device fulfils one or more criteria for switching to another set of data.

To give one example, the auxiliary data may specify that if the user is currently consuming virtual content corresponding to a first viewport from a first camera, then a switch may be made to a different set of virtual content data corresponding to a viewport of a second camera, which may partly overlap the same region in the virtual space. The metadata may specify further conditions. For example, the metadata may provide a prioritised list for determining which of a plurality of data sets, each of which relates to overlapping virtual content, is to be selected based on the context. A first different data set may be selected over a second, different data set based on direction of user movement, for example. To give another example, the auxiliary data may specify that if the user is currently consuming virtual content captured from a first camera which includes a first object-of-interest, then a switch may be made to a different set of virtual content data from a second camera which includes the same first object-of-interest. Again, the metadata may provide a prioritised list for determining which of a plurality of data sets, each of which includes a first object-of-interest, is to be selected base on context. A first different data set may be selected over a second, different data set based on distance from the object-of-interest, for example.

In other words, switching from one portion of the virtual content to another is enabled, at least partially based on the context of the user, and which enables either or both of the author of the virtual content and the user to determine how switching may be performed in such a way as to make interaction meaningful. This also avoids transmitting, e.g. streaming, content data which may not be relevant to what the author or the user desires. This may also avoid transmitting content which the user deems irrelevant and which may be disturbing or disorientating to the user.

FIG. 1 is a schematic illustration of a virtual reality display system 1 which represents user-end equipment. The virtual reality display system 1 includes a user device in the form of a virtual reality headset 20, for displaying video/image data representing a virtual reality space, and a virtual reality media player 10 for rendering the video/image data on the virtual reality headset 20. In some embodiments, a separate user control (not shown) may be associated with the virtual reality display system 1, e.g. a hand-held controller. Headset 20 may be referred to as a virtual reality headset or a head-mounted display (HMD).

In the context of this specification, a virtual space or world or an immersive space is any computer-generated version of a space, for example a captured real world space, in which a user can be immersed. The virtual reality headset 20 may be of any suitable type. The virtual reality headset 20 may be configured to provide virtual reality video, image and audio content data to a user. As such, the user may be immersed in virtual space.

The virtual reality headset 20 receives the virtual reality video/image data from a virtual reality media player 10. The virtual reality media player 10 may be part of a separate device which is connected to the virtual reality headset 20 by a wired or wireless connection. For example, the virtual reality media player 10 may include a games console, or a Personal Computer (PC) configured to communicate visual data to the virtual reality headset 20. Alternatively, the virtual reality media player 10 may form part of the virtual reality headset 20.

Here, the virtual reality media player 10 may comprise a head mount display, TV, mobile phone, smartphone or tablet computer configured to play content through its display. For example, the virtual reality media player 10 may be a touchscreen device having a large display over a major surface of the device, through which video content can be displayed. The virtual reality media player 10 may be inserted into a holder of a virtual reality headset 20. With such virtual reality headsets 20, a smart phone or tablet computer may display the video data which is provided to a user's eyes via respective lenses in the virtual reality headset 20. The virtual reality display system 1 may also include hardware configured to convert the device to operate as part of virtual reality display system 1. Alternatively, the virtual reality media player 10 may be integrated into the virtual reality headset 20. The virtual reality media player 10 may be implemented in software. In some embodiments, a device comprising VR media player software is referred to as the virtual reality media player 10.

The virtual reality display system 1 may include means for determining the spatial position of the user and/or orientation of the user's head. This may be by means of determining the spatial position and/or orientation of the virtual reality headset 20. Orientation of the virtual reality headset may be for example represented by yaw 24, pitch 22, and roll 23, that is, rotations about corresponding axes 27, 25, 26, as illustrated in FIG. 1. Over successive time frames, a measure of movement may therefore be calculated and stored. Such means may comprise part of the virtual reality media player 10. Alternatively, the means may comprise part of the virtual reality headset 20. For example, the virtual reality headset 20 may incorporate motion tracking sensors which may include one or more of gyroscopes, accelerometers and structured light systems. These sensors generate position data from which a current visual field-of-view (FOV) is determined and updated as the user, and so the virtual reality headset, changes position and/or orientation. The visual field-of-view at a particular time may be referred to as viewport, that is a region of omnidirectional image or video suitable for display and viewing by the user. Content shown in viewport depends on user position and orientation (and possibly gaze). The virtual reality headset 20 will typically comprise two digital screens for displaying stereoscopic video images of the virtual world in front of respective eyes of the user, and also two speakers for delivering audio, if provided from the virtual reality media player 10. In some embodiments, the virtual reality headset 20 may comprise a single digital screen having separate regions intended for each eye of the user. The embodiments herein, which primarily relate to the delivery of virtual reality content, are not limited to a particular type of virtual reality headset 20.

In some embodiments, the virtual reality display system 1 may include means for determining the gaze direction of the user. In some embodiments, gaze direction may be determined using eye gaze tracking sensors provided in the virtual reality headset 20. The eye gaze tracking sensors may, for example, be miniature cameras installed proximate the video screens which identify in real-time the pupil position of each eye. In some embodiments, the eye gaze tracking system may include infrared light emitting diodes that illuminate the eye cornea resulting in better detection of the pupil contour and producing corneal reflections such as glints that can be detected by the miniature cameras and be used as a means to increase the gaze tracking accuracy and robustness. The identified positions may be used to determine which part of the current visual FOV is of interest to the user. This information can be used for example to identify one or more sub-sets of content within the video data, e.g. objects or regions projected at a particular depth within the content. For example, the convergence point of both eyes may be used to identify a reference depth.

The virtual reality display system 1 may be configured to display virtual reality video/image data to the virtual reality headset 20 based on spatial position and/or the orientation of the virtual reality headset. A detected change in spatial position and/or orientation, i.e. a form of movement, may result in a corresponding change in the visual data to reflect a position or orientation transformation of the user with reference to the space into which the visual data is projected. This allows virtual reality content data to be consumed with the user experiencing a stereoscopic or a 3D virtual reality environment.

Audio data may also be provided to headphones or speakers provided as part of the virtual reality headset 20. The audio data may represent spatial audio source content. Spatial audio may refer to directional rendering of audio in the virtual reality space or world such that a detected change in the user's spatial position or in the orientation of their head may result in a corresponding change in the spatial audio rendering to reflect a transformation with reference to the space in which the spatial audio data is rendered.

The angular extent of the environment observable through the virtual reality headset 20 is called the visual field of view (FOV) or viewport. The actual field of view observed by a user depends on the inter-pupillary distance and on the distance between the lenses of the virtual reality headset 20 and the user's eyes, but the field of view can be considered to be approximately the same for all users of a given display device when the virtual reality headset is being worn by the user.

In embodiments to be described herein, the field of view is also referred to as the viewport.

Figure 2:
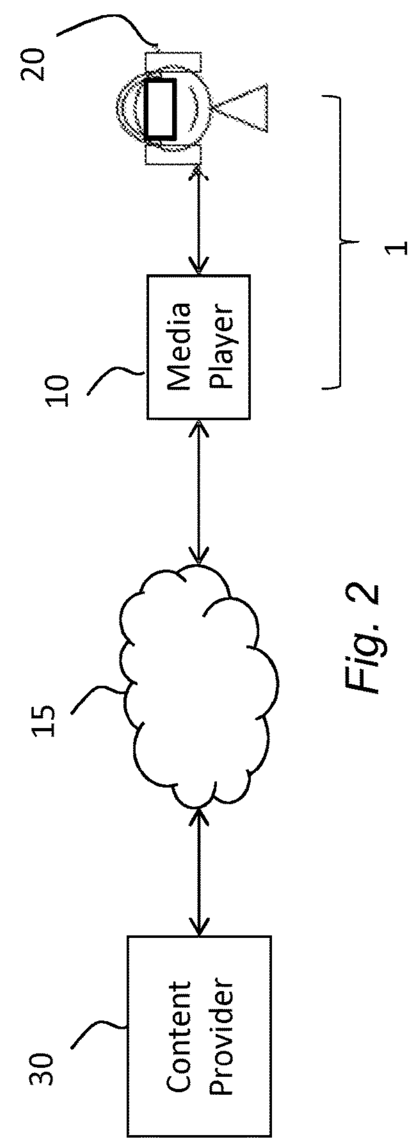
FIG. 2 is a block diagram of a computer network including the FIG. 1 virtual reality display system, according to embodiments.

Referring to FIG. 2, a remote content provider 30 may store and transmit virtual reality content data for output to the virtual reality headset 20. Responsive to receive or download requests sent by the virtual reality media player 10, the content provider 30 may stream the virtual reality data over a data network 15, which may be any network, for example an IP network such as the Internet. The data network 15 may be also a unidirectional network such as a multicast network or a broadcast network.

The remote content provider 30 may or may not be at the location or system where the virtual reality video is captured, created and/or processed.

For illustration purposes, we may assume that the content provider 30 also captures, encodes and stores the virtual reality content, as well as streaming it responsive to signals from the virtual reality display system 1.

Figure 3:
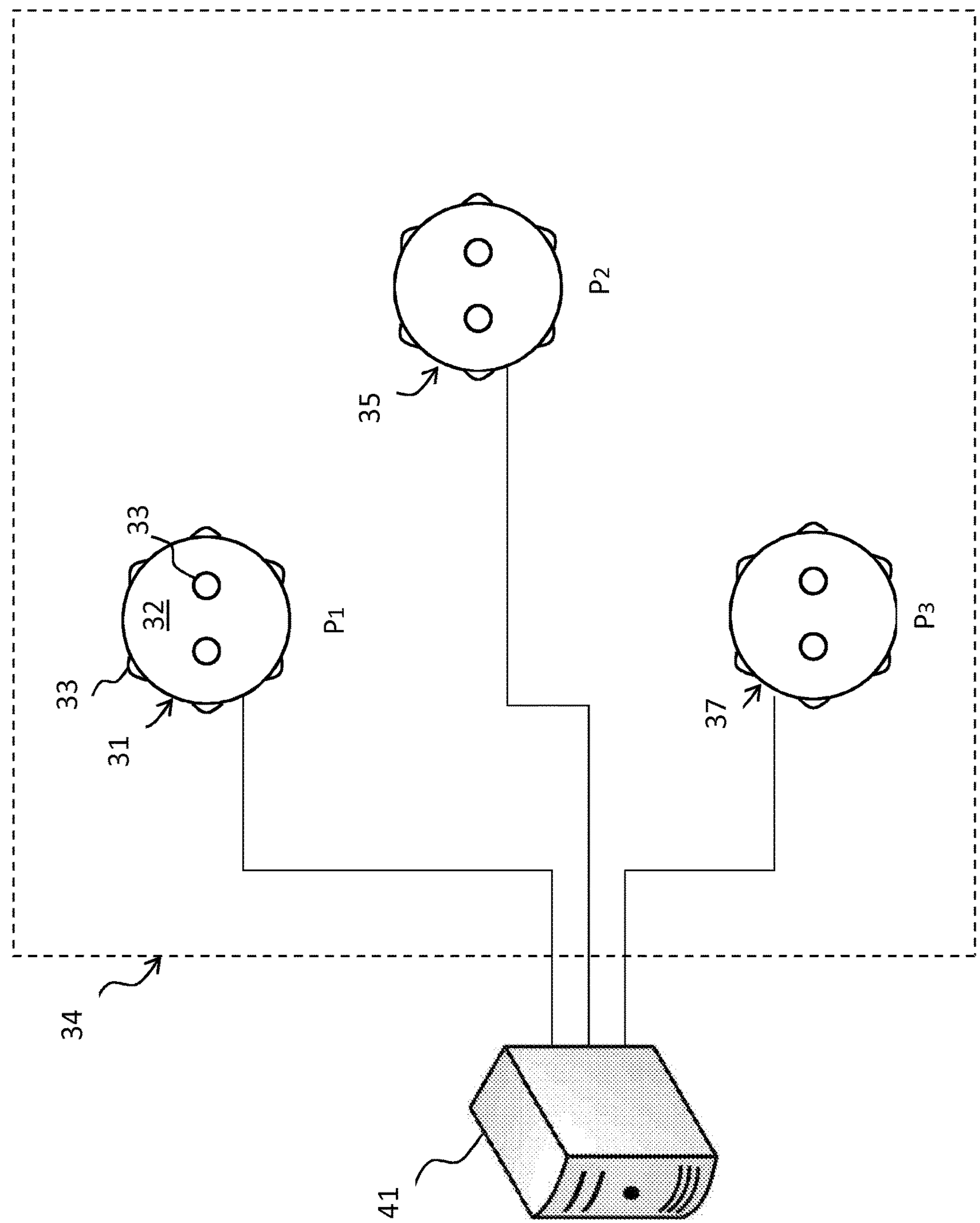
FIG. 3 is a schematic view of a capture space comprising a plurality of spatial capture devices at respective locations, connected to a processing apparatus, according to embodiments.

Referring to FIG. 3, an example virtual reality capturing scenario is shown, in which a plurality of capturing devices 31, 35, 37 are provided within a common capture space 34 for capturing a common scene. We assume that these capturing devices 31, 35, 37 are cameras. The common scene need not be a common physical scene. In some embodiments, logically related content from different physical scenes can also be associated with the common scene.

Each capturing device 31, 35, 37 is assumed to be a spatial capture apparatus in example embodiments. Each spatial capture apparatus 31, 35, 37 comprises a generally spherical body 32 around which are distributed a plurality of video cameras 33. For example, eight video cameras 33 may be provided. Each spatial capture apparatus 31, 35, 37 may therefore 30 capture 360° images, or omnidirectional images, by stitching images from the individual cameras 33 together, taking into account overlapping regions. Nokia's OZO camera is one such example. Multiple microphones (not shown) may also be distributed around the body 32 for capturing spatial audio. In some embodiments, one or more of the capture devices 31, 35, 37 may comprise a single camera. Regardless of the number of camera(s), the capture apparatuses 33 may be configured to capture monoscopic or stereoscopic content.

However, as will be appreciated, the spatial capture apparatuses 31, 35, 37 are not necessarily identical, and one or more may be another type of device and/or may be made up of plural physically separate devices. As will also be appreciated, although the content captured may be suitable for provision as immersive content, it may also be provided in a regular non-VR format for instance via a smart phone or tablet computer.

The respective locations of the spatial capture apparatuses 31, 35, 37 within the capture space 34 may be known by, or may be determinable by, a virtual reality processing apparatus 41 which may comprise all or part of the content provider 30 shown in FIG. 2. For instance, each spatial capture apparatus 31, 35, 37 may have a known fixed or dynamic location within the capture space 34 which is provided to, and stored within, memory of the virtual reality processing apparatus. Alternatively, or additionally, one or more of the spatial capture apparatuses 31, 35, 37 may include a location determination component for enabling their location to be determined. In some specific examples, a radio frequency location determination system such as Nokia's High Accuracy Indoor Positioning may be employed, whereby each spatial capture apparatus 31, 35, 37 may transmit messages for enabling a location server to determine their respective locations within the capture space 34. In some embodiments orientation offset w.r.t. magnetic north may be used as an indication of orientation of the capture apparatus. The virtual reality processing apparatus 41 may receive said positions from the location server, or may perform the role of the location server.

Alternatively, or additionally, the respective locations of one or a combination of capture apparatuses 31, 35, 37 within the capture space 34 may be time varying and known by, or may be determinable by, a virtual reality processing apparatus 41 which may comprise all or part of the content provider 30 shown in FIG. 2. In some embodiments, the capture apparatuses may be located in different non-contiguous scenes. For example, one camera may be located on or near a basketball court and another camera may be located outside the stadium. The metadata signalling can also cover this situation. This may be done by employing context based analysis to derive information based on the content analysis instead or in addition to relying on the capture scene positions of the camera.

It will be appreciated that a greater number of spatial capture apparatuses 31, 35, 57 may be provided in some situations. In some situations, two spatial capture apparatuses may be provided. In some situations, only one spatial capture apparatus may be provided and different sets representing the capture space 34 may be provided by different cameras of the single spatial capture apparatus.

In the example of FIG. 3, the virtual reality processing apparatus 41 may be a server, or associated with a server, or a cloud computing network, or an edge server, that generates the virtual content data and transmits it to users wishing to consume the virtual content through a user device, such as the virtual reality headset 20 shown in FIG. 1. The virtual reality processing apparatus 41 may be configured to receive and store signals captured by one or more spatial capture apparatuses 31, 35, 37. The signals may be received at the virtual reality processing apparatus 14 in real-time during capture of the audio and/or video signals or may be received subsequently, for instance via an intermediary storage device. In such examples, the virtual reality processing apparatus 41 may be local to the audio capture environment or may be geographically remote from the audio capture environment in which the spatial capture apparatuses 31, 35, 37 are provided. In some examples, the virtual reality processing apparatus 41 may even form part of one or more of the spatial capture apparatuses 31, 35, 37.

The audio signals received by the virtual reality processing apparatus 41 may comprise a multichannel audio input in a loudspeaker format. Such formats may include, but are not limited to, a stereo signal format, a 4.0 signal format, 5.1 signal format and a 7.1 signal format. In such examples, the signals captured by the system of FIG. 3 may have been pre-processed from their original raw format into the loudspeaker format. Alternatively, in other examples, audio signals received by the virtual reality processing apparatus 41 may be in a multi-microphone signal format, such as a raw eight channel input signal. The raw multi-microphone signals may, in some examples, be pre-processed by the virtual reality processing apparatus 41 using spatial audio processing techniques thereby to convert the received signals to loudspeaker format or binaural format. Down mixing may also be performed to limit the audio signal to, for example, four channel loudspeaker format.

Alternatively, in other examples, audio signals may be received by the virtual reality processing apparatus 41 as ambisonics or audio objects.

Figure 4:
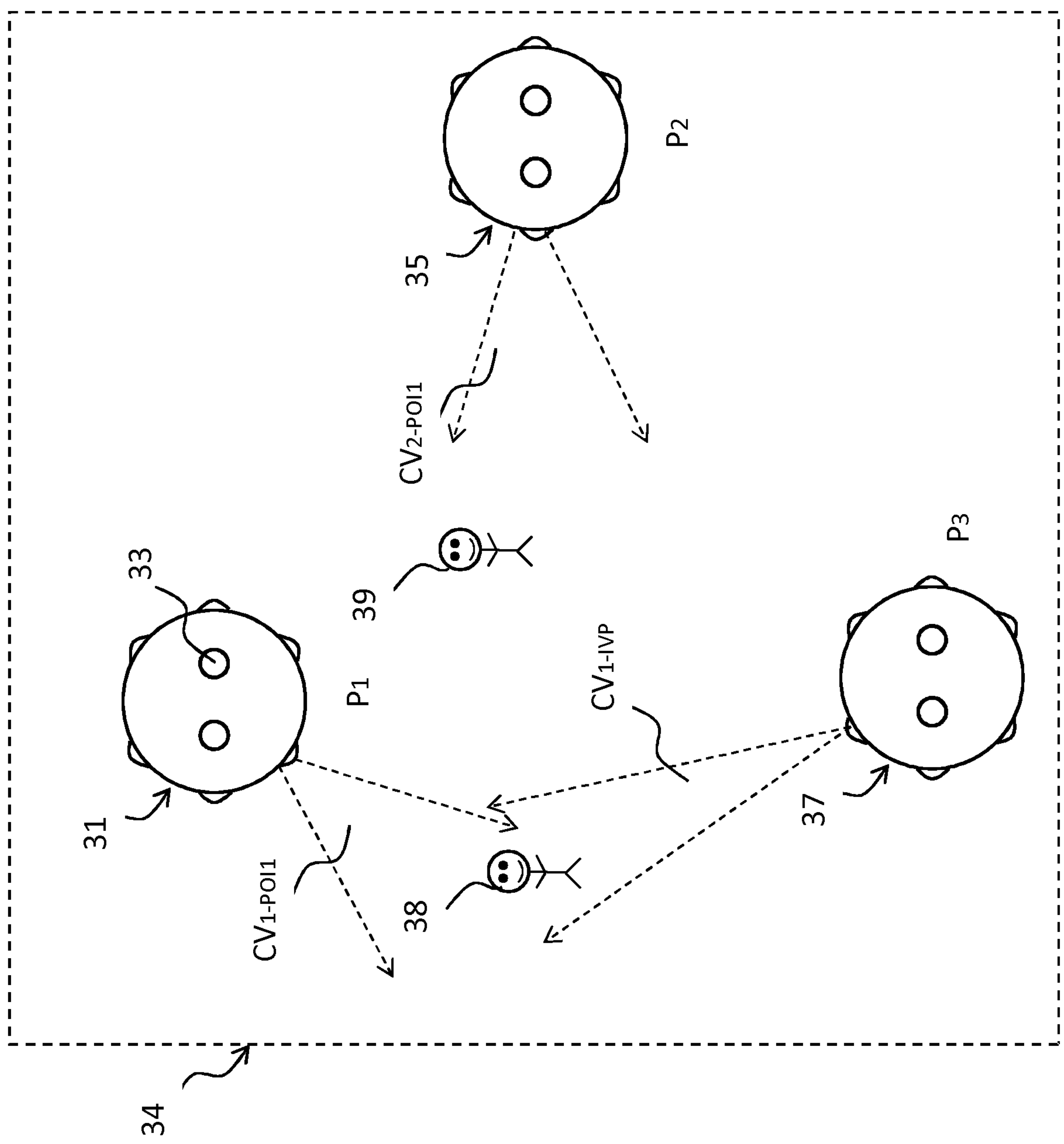
FIG. 4 is a schematic view of an example capture space similar to FIG. 3, comprising a plurality of object-of-interest.

FIG. 4 shows the first, second and third spatial capture apparatuses 31, 35, 37 of FIG. 3 and first and second objects-of-interest 38, 39 which are captured within the common capture space 34. FIG. 4 shows one example embodiment. The first, second and third spatial capture apparatuses 31, 35, 37 may capture data simultaneously from the respective positions P1, P2, P3.

The virtual reality processing apparatus 41 may receive one or all of video, image and audio data from each of the first, second and third spatial capture apparatuses 31, 35, 37 for generating omnidirectional video, image and audio data from each respective position P1, P2, P3 in the capture space 34. Example embodiments will focus of video and image capture but it will be appreciated that the embodiments can relate only to audio or to all of video, image and audio.

For each of the first, second and third spatial capture apparatuses 31, 35, 37, video and/or images are captured from each individual camera 33 and may be made available individually or they may be stitched together to provide an omnidirectional video and/or image at each respective spatial position.

The virtual reality processing apparatus 41 may provide a plurality of data sets, each representing different regions of the capture space 34. These may be transmitted to one or more users, such as to the virtual reality media player 10 shown in FIGS. 1 and 2. The virtual reality media player 10 is configured to render one or more selected data sets for consumption by the user at a given time based on the user's context. In some embodiments, a plurality of content data sets may be transmitted simultaneously, enabling the virtual reality media player 10 to select which content data set to render at a given time. In some embodiments, one, or a limited subset of content data sets may be transmitted based on a request received from the virtual reality media player 10.

During consumption of the content data set or sets covering a particular region of the capture space 34, it may be beneficial to switch to a different set of content data covering another region of the capture space. This may be appropriate to the user experience, for example in order to avoid a misleading or disturbing user experience. It may also be appropriate to guide the user through a particular narrative that the author of the virtual content wishes to convey to the user. In embodiments where the user has a greater degree of freedom in terms of their exploration of the content data, there may be a number of different possible capture positions and/or orientations which could be used, for example as the user moves in the space.

Accordingly, example embodiments provide further data, termed auxiliary data, which may be provided in association with the plurality of content data sets to enable switching between a current set of consumed content data and another set of content data which shows a different region. This auxiliary data permits switching to be performed in a controlled way, based on a context of the user device, for example the virtual reality headset 20.

In some embodiments, the context is determined locally, for example based on the spatial position of the virtual reality headset 20 in relation to the created virtual space.

In some embodiments, the context is determined based on the position and orientation of the virtual reality headset 20, for example to determine a current viewport such that a switch may be made to a different data set at least partially covering the region covered by the current viewport. This switch may be triggered by movement, at a particular time stamp, timing offset or some other interaction.

In some embodiments, the context is determined by identifying one or more objects-of-interest in the current data set, and possibly taking into account previously-consumed data sets. An object-of-interest may comprise any identifiable object, such as a person, animal or inanimate object. The object-of-interest may be determined automatically or manually. The former may comprise using pattern or shape-recognition algorithms, as are generally known in the art, and machine learning techniques may also be used. The auxiliary data may therefore identify which other data set to switch to, based on keeping the object-of-interest in view.

In the above embodiments, therefore, the auxiliary data may comprise signaling information or metadata prioritizing one or more different data sets over one or more others, based on a determined context. The prioritizing may be determined by a list, for example specifying that "if situation 1 occurs, switch to data set A; if situation 2 occurs, switch to data set B" and so on. The prioritizing may utilize additional rules, which may involve automatically detected context data and/or manually entered preferences. In the above brief examples, a situation can be any contextual determination.

In some embodiments, the auxiliary data may provide positional data for a plurality of different capture positions in the capture scene 34. For example, the positional data may comprise the relative positions or offsets of one or more spatial camera positions to that of the one currently being employed by the user.

The auxiliary data may be transmitted from the virtual reality processing apparatus 41 simultaneously with one or more content data sets. Alternatively, the auxiliary data may be transmitted in advance of the one or more content data sets, and processed at the virtual media player 10 dependent on the user's interaction with the currently-consumed content data set.

In some embodiments, further auxiliary data may be transmitted to the virtual reality media player 10. This may be responsive to a request for further auxiliary data.

In some embodiments, the virtual reality media player 10 may request one or more particular content data sets from the virtual reality processing apparatus 41, e.g. responsive to the switch indicated by the auxiliary data given a current context.

Thus, referring to FIG. 4, a user wearing the virtual reality headset 20, at a current time may be consuming rendered video data generated by only a single one of the first, second and third spatial capture apparatuses 31, 35, 37. For example, the user may currently consume a scene corresponding to the viewport $Cv_1$-IVP, which is indicated in FIG. 4 extending from the third spatial capture apparatus 37 at position P3. This viewport $CV_1$-IVP covers a limited region of the capture space 34 which includes the first object-of-interest 38.

This limited region is currently rendered to the virtual reality headset 20.

Also received from the virtual reality processing apparatus may be a set of auxiliary data, which may be in the form of metadata, which is usable by the user-end device (whether the virtual reality media player 10 or the virtual reality headset 20) to cause switching to a different set of content data.

The preferred or prioritized spatial capture device may be termed the destination device, having a destination viewport.

In this example, switching from the third spatial capture apparatus 37 to either the first or second spatial capture apparatus 31, 35 is determined by the auxiliary data which may determine that the destination viewport will be $CV_1$-$POI_1$ from the first spatial capture apparatus, and not $CV_2$-$POI_1$ from the second spatial capture apparatus. This may be on the basis of the first spatial capture apparatus being closer to the first object-of-interest 38 and $CV_1$-$POI_1$ covers it unobscured (whereas $CV_2$-$POI_1$ is partially obscured by the second point-of-interest 39.)

Accordingly, the auxiliary data allows the author of the virtual content to control how switching is performed, based on the user-end context.

For example, if the user subsequently becomes more interested in the second point-of-interest 39 (which may occur if their gaze direction changes) then the auxiliary data may determine that, in this situation, a switch is made to $CV_2$-$POI_1$.

In one embodiment different camera switching options may be provided in the auxiliary for different user contexts. User context may be determined by a client device (content consumer), which may select the subsequent viewport based on criteria or preference that matches the contextual preference determined by the client. For example, the auxiliary data may include different viewport recommendations for different current viewports of the user.

The server may provide signalling information (metadata) associated with a set of options, which are subsequently selectable by the client depending on the user context.

Switching may occur automatically at a particular time stamp or timing offset, or it may occur as a result of a user movement or interaction, for example changing focus to a new object-of-interest.

Transmitting the auxiliary data may be performed simultaneously with the content data sets if the author wishes to maintain closer control of how switching is performed. This permits transmission of the creative intent and also reduces the burden on implementing a switching client to limit implementation complexity. Further, the auxiliary data permits switching without needing to transmit full information on the spatial relationship between the multiple spatial capture apparatuses 31, 35, 37.

The auxiliary data may be delivered from the virtual reality processing apparatus 41 as part of the file format, as well as, or alternatively to, the auxiliary data accompanying the content data sets. The former may be beneficial for client-controlled streaming architectures such as MPEG-DASH, for example.

An example set of auxiliary data, in this case in metadata format, is provided below. The metadata may include one or more of the following parameters:

```
{
<User-aware-switching>
  Time stamp or temporal interval
  Current camera or content ID
  <Switch-profile>
    Criteria: current-viewport-dependent CV1
    [Viewport Range 1], Destination Camera C2, Landing viewport LVC2
    [Viewport Range 2], Destination Camera C3, Landing viewport LVC3
    [Viewport Range 3], Destination Camera C1, Landing viewport LVC1
  </Switch-profile>
```

In one embodiment, the switching occurs at a time stamp or after a time interval. The current spatial capture apparatus is identified or a content identifier may be used. The metadata therefore is associated with a currently consumed data set. The switch profile is viewport dependent and identifies in this case three different viewport ranges, and, for each, a different destination camera and viewport (termed "landing viewport") that is switched to at the time stamp or interval, dependent on the user's viewport. In one embodiment, the time stamp(s) or time interval may be used as reference point(s) for different temporal segments of the consumed content. The client may for example use the metadata as a lookup table to select the destination camera, landing viewport and time point for making the switch.

A further set of metadata, which may follow the above metadata or be transmitted separately, may comprise a further switch profile which is object-of-interest dependent. One or more of the following metadata parameters may be included in the set of auxiliary data:

```
  <Switch-profile>
    Criteria: ooi-dependent CV1
    [Front], Destination Camera C2, Landing viewport LVC2
    [Side], Destination Camera C3, Landing viewport LVC3
    [Close-up], Destination Camera C1, Landing viewport LVC1
  </Switch-profile>
}
```

In this case, for each different orientation of the object-of-interest to be viewed, a different destination camera and landing viewport is provided.

In some embodiments, the virtual reality headset 20 provides to the the virtual reality processing apparatus 41 its current viewport information. The current viewport information may be defined for example by two angles in a spherical coordinate system (in case of 3DOF content) or the default viewing position defined by two angles in a spherical coordinate system plus the distance (for 3DOF+/6DOF content.) This information may be delivered together with a variable describing the type of switching and the criteria (e.g. user-aware-switch: criteria1). This may be relevant for server-driven content push implementations. In one example, the client may signal its intention to switch to another camera. The server may then determine the appropriate content to be sent to the client. In this case, the "lookup" for appropriate switching is done by the server.

In overview, the author of the virtual data content has various options.

A first option is for the virtual reality processing apparatus 41 to transmit recommended viewports corresponding to a particular capture apparatus or content identifier, depending on the viewport when the switch is to be performed.

Another option is for the virtual reality processing apparatus 41 to transmit recommended viewports corresponding to one or more objects of interest, which can be object specific and can be used at the client end to request content relating to that object. This approach may also be relevant to sending scene specific data, and is not dependent on knowledge of the specific positional relationship between the different capture apparatuses. This approach is also applicable when not overlapping in space or time. There may however need to be provided additional metadata to provide a contextual relationship between content captured at different locations. This contextual relationship in the metadata may be utilized at the user-end to make choices regarding which capture apparatus needs to be used.

Another option is for the auxiliary data only to provide the spatial relationship between the different capture apparatuses. The spatial relationship, if it comprises information on the orientation of the data sets for each individual camera, as well as the position of the respective capture apparatuses, enables end-users to perform their own switching choices. This provides for full flexibility for end-users, although the content author has limited or no ability to guide the content consumption experience. In this embodiment, geometry information about the capturing cameras may be provided to the client. Based on the geometry information a client may determine a landing viewport at a destination camera and request the corresponding data from a server.

Figure 5:
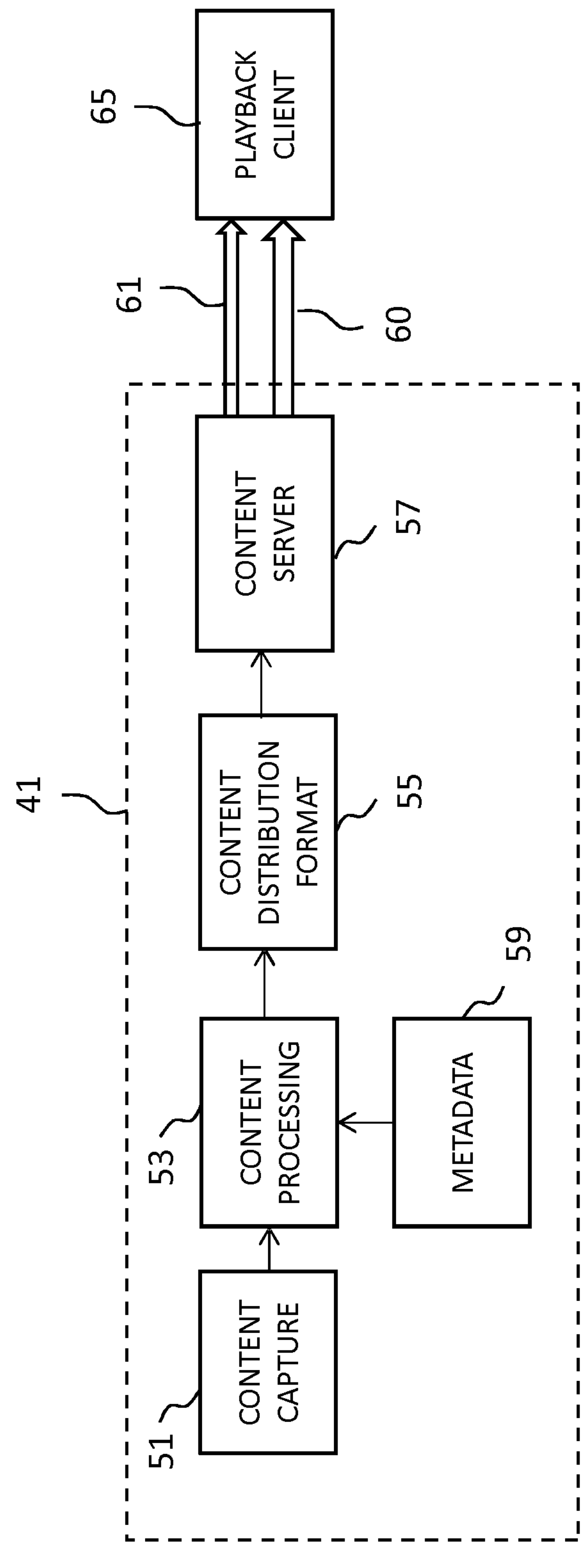
FIG. 5 is a block diagram showing example processing blocks of a content provider apparatus and of a client-end device, according to embodiments.

FIG. 5 is a block diagram of functional components at both the virtual reality processing apparatus 41 and at the virtual reality media player 10.

A first block 51 represents content capture, which is performed by receiving data sets from each of the different capture apparatuses 31, 35, 37. A further block 53 comprises a content processing block which may involve performing one or more video and/or audio processing operations, and may involve receiving authored metadata from a further block 59, which may be received through a user interface. A further block 55 comprises a content distribution format block, which dictates the format of the data for transmitting to one or more end-users. A further block 57 comprises a content server block which serves the content data and accompanying auxiliary data, in this case metadata, to one or more end-users.

Two transmissions channels or streams 60, 61 are indicated; a first one being the content data sets and the second being the metadata.

A playback client block 65 is also shown at the user-end, and may be a software client provided on memory of the virtual reality media player 10 shown in FIGS. 1 and 2.

Some embodiments may relate to indicating, in a bit stream, a container file, and/or a manifest and/or parsing information from a bit stream, a container file, and/or a manifest. The bit stream may, for example, be a video or image bit stream (such as an HEVC bit stream) wherein the auxiliary data may utilize, for example, supplemental enhancement information (SEI) messages. A container file may, for example, comply with the ISO base media file format, the Matroska file format, or the Material eXchange Format (MXF.) The manifest may, for example, conform to the Media Presentation Description (MPD) of MPEG-DASH (ISO/IEC 23009-1), the M3U format or the Composition Playlist (CPL) of the Interoperable Master Format (IMF.) It should be understood that these formats are provided as examples and that embodiments herein are not limited to such.

Some embodiments may be similarly realized with other similar container or media description formats, such as the Session Description Protocol (SDP.) Some embodiments may be realized with a suite of bit stream format(s), container file format(s) and manifest format(s), in which the auxiliary data may be provided. MPEG Omnidirectional Media Application Format (OMAF) is an example of such a suite of formats.

It should be understood that instead of, or in addition to, a manifest, embodiments may similarly apply to a container file format and/or a media bit stream. For example, instead of, or in addition to, indicating the number of capture apparatuses and the spatial region to switch to when there is switch between two capture apparatuses, based on the context of the user consuming the content in a manifest, they can be indicated within metadata of a container file format that also contains, or refers to, the encoded bit stream.

Although embodiments have been described in relation to MPEG-DASH or DASH, it should be understood that embodiments may use other forms of streaming over HTTP, such as Apple HTTP Live Streaming (HLS).

In the above, embodiments have been described by referring to the term streaming. It should be appreciated that embodiments may use other forms of video transmission, such as progressive downloading, file delivery, and conversational video communications, for example video telephone communications.

Figure 6:
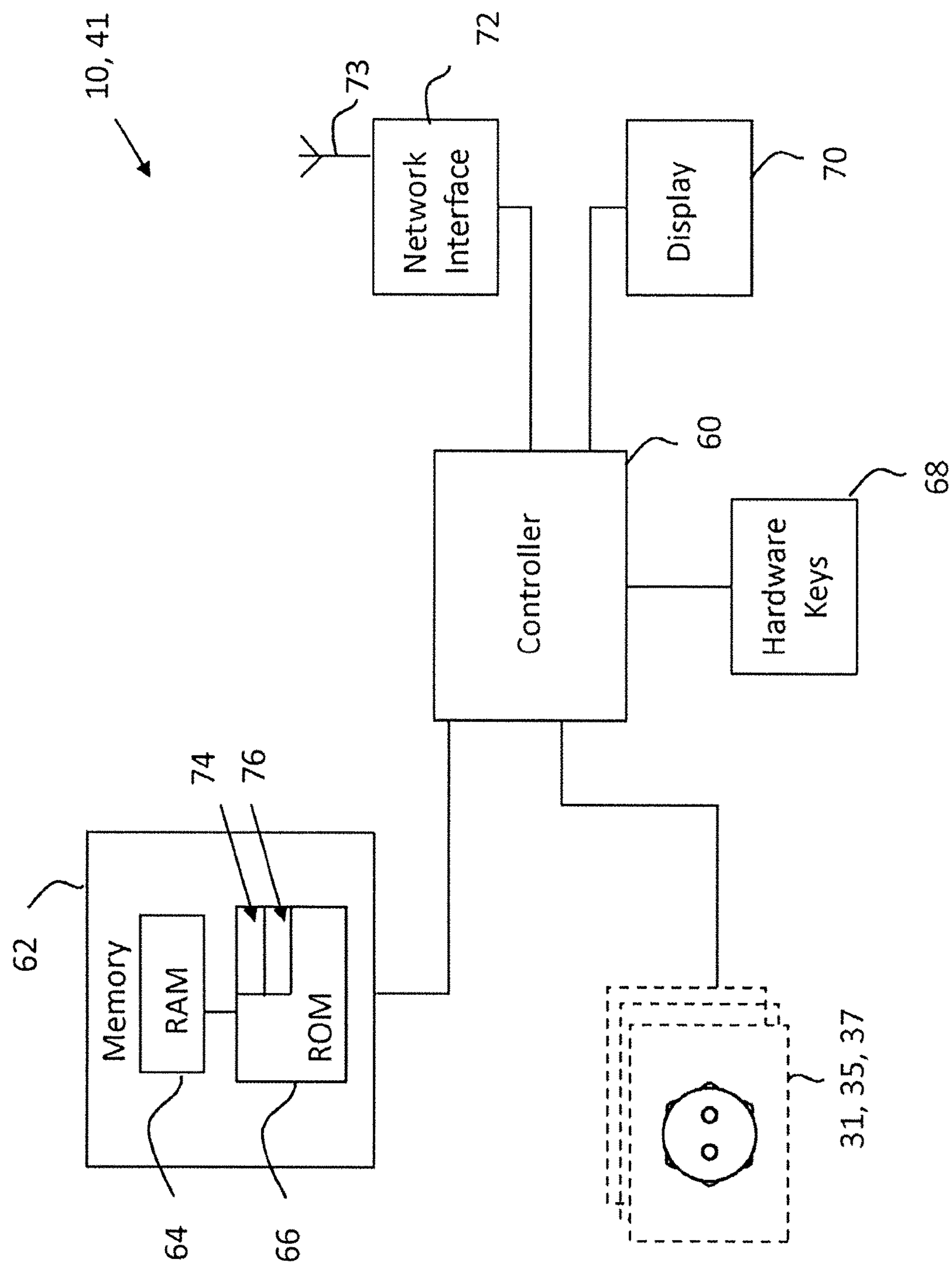
FIG. 6 is a block diagram showing hardware components of either of a content provider apparatus or a client-end device, according to embodiments.

FIG. 6 is a schematic diagram of components of either of the content provider 30 or the virtual reality media player 10 shown in FIG. 2. For ease of explanation, we will assume that the components are those in the v of the content provider 30, but it will be appreciated that the following is applicable to the virtual reality media player 10.

The content provider 30 may have a controller 60, a memory 62 closely coupled to the controller and comprised of a RAM 64 and ROM 66, and, optionally, hardware keys 68 and a display 70. The content provider 30 may comprise one or more network interfaces 72 for connection to a network, e.g. a modem which may be wired or wireless. An antenna 73 is coupled to the one or more network interfaces 72.

The controller 60 is connected to each of the other components in order to control operation thereof.

The memory 62 may comprise a non-volatile memory, a hard disk drive (HDD) or a solid state drive (SSD). The ROM 66 of the memory 62 stores, amongst other things, an operating system 74 and may store software applications 76. The RAM 64 of the memory 62 may be used by the controller 60 for the temporary storage of data. The operating system 74 may contain code which, when executed by the processor ware components of the content provider 30.

The controller 60 may take any suitable form. For instance, it may be a microcontroller, plural microcontrollers, a processor, or plural processors and it may comprise processor circuitry.

The content provider 30 may be a standalone computer, a server, a console, or a network thereof. As shown in FIG. 3, the content provider 30 may comprise the virtual reality processing apparatus 41

In some embodiments, the content provider 30 may also be associated with external software applications. These may be applications stored on a remote server device and may run partly or exclusively on the remote server device.

These applications may be termed cloud-hosted applications. The content provider 30 may be in communication with the remote server device in order to utilize the software application stored there.

The first, second and third spatial capture apparatuses 31, 35, 37 are shown connected to the controller 60 for completeness.

Figures 7, 8:
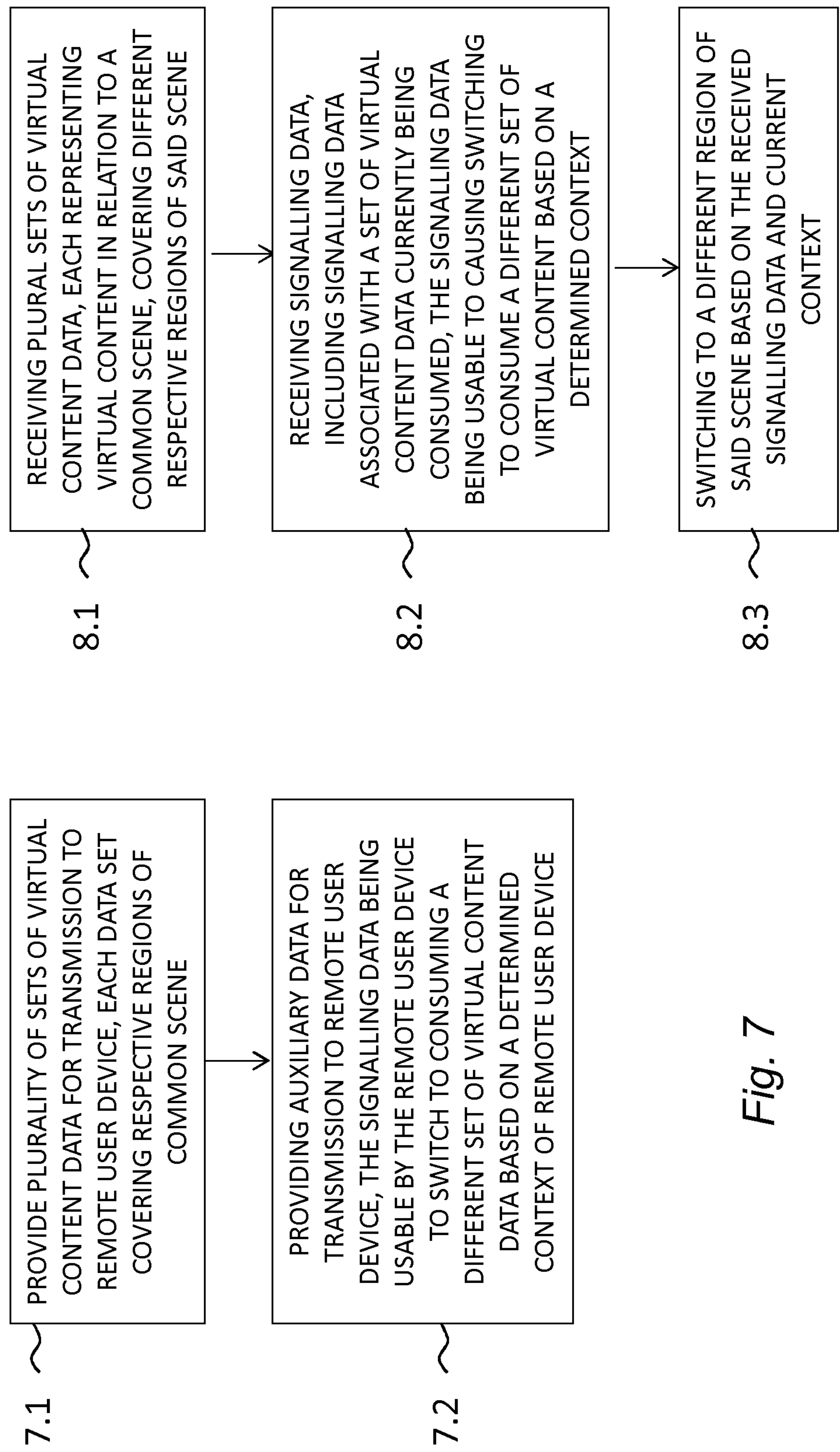
FIG. 7 is a flow diagram showing processing operations of a method performed at a content provide apparatus, according to embodiments.
FIG. 8 is a flow diagram showing processing operations of a method performed at a client-end device, according to embodiments.

FIG. 7 is a flow diagram illustrating, in accordance with one embodiment, processing operations that may be performed by the content provider 30, for example by software, hardware or a combination thereof. Certain operations may be omitted, added to, or changed in order. Numbering of operations is not necessarily indicative of processing order.

A first operation 7.1 comprises providing a plurality of virtual content data sets for transmission to a remote user device, the data sets representing virtual content in relation to a common scene and each covering a different respective region of said scene.

A further operation 7.2 may comprise providing auxiliary data for transmitting to the remote user device, the auxiliary data being usable to cause the remote user device to switch from consuming a current data set representing a current region of said scene to a different set of virtual content data representing a different region of said scene, the switching being based at last partly on a determined context of the remote user device FIG. 8 is a flow diagram illustrating, in accordance with one embodiment, processing operations that may be performed by the user-end client, for example by software, hardware or a combination thereof at the virtual reality media player 10 of FIG. 2. Certain operations may be omitted, added to, or changed in order. Numbering of operations is not necessarily indicative of processing order.

A first operation 8.1 comprises receiving a plurality of virtual content data from a server, the data sets representing virtual content in relation to a common scene, and each covering a different respective region of said scene.

A further operation 8.2 comprises receiving auxiliary data, the auxiliary data being usable to cause the apparatus to switch from consuming a current virtual content data set representing a current region of said scene to a different virtual content data set representing a different region of said scene based at last partly on a determined context of the apparatus.

A further operation 8.3 comprises switching to a different virtual content data set based on the auxiliary data and a determined context of the apparatus.

For the avoidance of doubt, references to virtual reality (VR) are also intended to cover related technologies such as augmented reality (AR.)

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus comprising:

at least one processor; and at least one non-transitory memory including computer program code;

the at least one memory and the computer program code configured to, with the at least one processor, cause the apparatus at least to:

provide a plurality of virtual content data sets for transmission to a remote user device, the virtual content data sets representing virtual content in relation to a common scene from different spatial locations of the common scene;

transmit one or more of the data sets to the remote user device for consumption; and transmit to the remote user device auxiliary data, the auxiliary data being usable to cause the remote user device to switch from consuming a current data set representing the common scene from a current location to a different set of virtual content data representing the common scene from a different location, the switching being based at least partly on a determined context of the remote user device;

wherein the auxiliary data is transmitted with a format that comprises a list of viewports, the auxiliary data being usable to cause the remote user device to switch to at least one viewport within the list of viewports for consumption of the at least one viewport, based at least partly on the determined context of the remote user device.

2. The apparatus of claim 1, wherein the transmitted auxiliary data is usable with the remote user device to cause switching to the different set of virtual content data based at least partly on a locally-determined context of the remote user device.

3. The apparatus of claim 1, wherein plural sets of virtual content data of the plurality of virtual content data sets are transmitted substantially simultaneously.

4. The apparatus of claim 3, wherein the auxiliary data is transmitted simultaneously with the virtual content data.

5. The apparatus of claim 3, wherein the auxiliary data is transmitted in advance of the plural sets of virtual content data.

6. An apparatus comprising:

at least one processor; and at least one non-transitory memory including computer program code;

the at least one memory and the computer program code configured to, with the at least one processor, cause the apparatus at least to:

receive a plurality of virtual content data sets from a server, the virtual content data sets representing virtual content in relation to a common scene from different spatial locations of the common scene;

receive auxiliary data, the auxiliary data being usable to cause the apparatus to switch from consuming a current virtual content data set representing the common scene from a current location to a different virtual content data set representing the common scene from a different location based at least partly on a determined context of the apparatus;

wherein the auxiliary data is received with a format that comprises a list of viewports, the auxiliary data being usable to cause the apparatus to switch to at least one viewport within the list of viewports for consumption of the at least one viewport, based at least partly on the determined context of the apparatus; and switch to the different virtual content data set comprising the at least one viewport, based on the auxiliary data and the determined context of the apparatus.

7. The apparatus of claim 6, wherein plural sets of virtual content data of the plurality of virtual content data sets are received substantially simultaneously.

8. The apparatus of claim 7, wherein the auxiliary data is received simultaneously with the virtual content data.

9. The apparatus of claim 7, wherein the auxiliary data is received in advance of the plural sets of virtual content data.

10. The apparatus of claim 7, wherein the auxiliary data is received as metadata indicating, for each of a plurality of switchable data sets, a corresponding context of the apparatus that causes switching to that data set.

11. The apparatus of claim 6, wherein the data sets represent virtual content captured from different respective spatial positions in the scene, and wherein the auxiliary data is usable with the apparatus to switch to a data set representing a different spatial position in the scene.

12. The apparatus of claim 11, wherein the data sets represent virtual content captured from different spatial capture devices at the respective spatial positions in the common scene.

13. The apparatus of claim 12, wherein the virtual content data sets further represent virtual content captured from different orientations of each spatial capture device, and wherein the auxiliary data is usable with the apparatus to switch to a particular orientation of a selected one of the spatial capture devices.

14. The apparatus of claim 7, wherein the auxiliary data indicates one or more of the viewports of the scene, to be switched to based on the viewport of a currently-consumed set of virtual content data.

15. The apparatus of claim 14, wherein the auxiliary data indicates one or more of the viewports of the scene which capture a region of said scene overlapping the viewport of the currently-consumed set of virtual content data.

16. The apparatus of claim 6, wherein the auxiliary data indicates one or more of the viewports of the scene, to be switched to based on viewports capturing a region of said scene which includes an object-of-interest.

17. A method, comprising:

providing a plurality of virtual content data sets for transmission to a remote user device, the virtual content data sets representing virtual content in relation to a common scene from different spatial locations of the common scene;

transmitting one or more of the data sets to the remote user device for consumption; and transmitting to the remote user device auxiliary data, the auxiliary data being usable to cause the remote user device to switch from consuming a current data set representing the common scene from a current location to a different set of virtual content data representing the common scene from a different location, the switching being based at least partly on a determined context of the remote user device;

wherein the auxiliary data is transmitted with a format that comprises a list of viewports, the auxiliary data being usable to cause the remote user device to switch to at least one viewport within the list of viewports for consumption of the at least one viewport, based at least partly on the determined context of the remote user device.

18. The method of claim 17, wherein the transmitted auxiliary data is usable with the remote user device to cause switching to the different set of virtual content data based at least partly on a locally-determined context of the remote user device.

19. A method, comprising:

receiving a plurality of virtual content data sets from a server, the virtual content data sets representing virtual content in relation to a common scene, and the data sets representing the virtual content in relation to the common scene from different spatial locations of the common scene;

receiving auxiliary data, the auxiliary data being usable to cause an apparatus to switch from consuming a current virtual content data set representing the common scene from a current location to a different virtual content data set representing the common scene from a different location based at least partly on a determined context of the apparatus;

wherein the auxiliary data is received with a format that comprises a list of viewports, the auxiliary data being usable to cause the apparatus to switch to at least one viewport within the list of viewports for consumption of the at least one viewport, based at least partly on the determined context of the apparatus; and switching to the different virtual content data set comprising the at least one viewport, based on the auxiliary data and the determined context of the apparatus.

20. The method of claim 19, further comprising determining the context of the apparatus.

21. The apparatus of claim 1, wherein the list of viewports of the auxiliary data transmitted with the format comprises a respective range of viewpoints for a respective viewport and a respective one of the at least one viewport.

22. The apparatus of claim 21, the auxiliary data further comprising a respective identifier (ID) for a respective viewpoint within the range of viewpoints, the identifier of the auxiliary data being usable to cause the apparatus to identify the switched to at least one viewport within the list of viewports.

23. The apparatus of claim 6, the at least one memory and the computer program code configured to, with the at least one processor, cause the apparatus at least to:

determine whether a field of view of a user of the apparatus covers more than one of the at least one viewport;

determine a closeness of an object of interest to the more than one of the at least one viewport, the object of interest being of interest to a user of the remote user device;

select to switch to the at least one viewport that is closest to an object of interest in the scene within the field of view of the user.

24. A non-transitory computer-readable medium comprising program instructions stored thereon which are configured to, when executed with at least one processor, cause the at least one processor to perform the method of claim 17.

25. A non-transitory computer-readable medium comprising program instructions stored thereon which are configured to, when executed with at least one processor, cause the at least one processor to perform the method of claim 19.

26. The apparatus of claim 1, wherein the auxiliary data comprises a correspondence between an orientation of the virtual content and the at least one viewport within the list of viewports, wherein the auxiliary data is usable with the apparatus to switch to a particular orientation of a selected one of the at least one viewport.

27. The apparatus of claim 26, wherein the auxiliary data comprises a correspondence between the orientation of the virtual content and a spatial capture device among a set of different spatial capture devices, wherein the auxiliary data is usable with the apparatus to switch to a particular orientation of a selected one of the spatial capture devices.

28. The apparatus of claim 26, wherein the orientation of the virtual content corresponds to an object of interest to be viewed.

29. The apparatus of claim 1, wherein the auxiliary data comprises information about a spatial relationship between different capture apparatuses used to capture the virtual content, the information about the spatial relationship comprising information about orientation of the virtual content data sets for one of the different capture apparatuses, and the position of the one of the different capture apparatuses, the information about the spatial relationship configured to be used with the remote user device to determine a landing viewport of the at least one viewport at a destination capture apparatus of the different capture apparatuses.

* * * * *